(12) United States Patent
Martin et al.

(10) Patent No.: US 9,781,451 B2
(45) Date of Patent: Oct. 3, 2017

(54) APPARATUS AND METHOD FOR DECODING COMPRESSED VIDEO

(71) Applicant: Squadeo S.A.S., Marly le roi (FR)

(72) Inventors: Francois Martin, Paris (FR); Xiaobo Liu, Beijing (CN)

(73) Assignee: Squadeo S.AS., Marly le Roi (FR)

(*) Notice: Subject to any disclaimer, the term of this patent is extended or adjusted under 35 U.S.C. 154(b) by 132 days.

(21) Appl. No.: 14/546,928

(22) Filed: Nov. 18, 2014

(65) Prior Publication Data

US 2015/0163520 A1 Jun. 11, 2015

(30) Foreign Application Priority Data

Dec. 11, 2013 (EP) .................................. 13290312

(51) Int. Cl.
*H04N 19/88* (2014.01)
*H04N 19/85* (2014.01)
*H04N 19/513* (2014.01)
*H04N 19/70* (2014.01)
*H04N 19/46* (2014.01)
(Continued)

(52) U.S. Cl.
CPC ............. *H04N 19/88* (2014.11); *H04N 19/40* (2014.11); *H04N 19/46* (2014.11); *H04N 19/48* (2014.11); *H04N 19/513* (2014.11); *H04N 19/70* (2014.11); *H04N 19/85* (2014.11); *H04N 21/42623* (2013.01); *H04N 21/4405* (2013.01); *H04N 21/4408* (2013.01)

(58) Field of Classification Search
CPC ........ H04N 19/00; H04N 19/88; H04N 19/40; H04N 19/46; H04N 19/463; H04N 19/52; H04N 19/513; H04N 19/70; H04N 19/85; H04N 21/4405; H04N 21/4408
See application file for complete search history.

(56) References Cited

U.S. PATENT DOCUMENTS

2003/0204718 A1* 10/2003 Connelly .................. H04L 9/00
713/150
2004/0105543 A1* 6/2004 Koto ...................... G06T 9/004
380/210
(Continued)

FOREIGN PATENT DOCUMENTS

WO 03/107586 A1 12/2003
WO 2012/091640 A1 7/2012

OTHER PUBLICATIONS

Dai, F. et al. "Restricted H.264/AVC Video Coding for Privacy Protected Video Scrambling", J. Vis. Commun. Image Represent., vol. 22, No. 6, pp. 479-490 (2011).
(Continued)

*Primary Examiner* — Kambiz Zand
*Assistant Examiner* — Ayoub Alata
(74) *Attorney, Agent, or Firm* — Robert A. Blaha; Smith Tempel Blaha LLC

(57) ABSTRACT

A method and apparatus for decoding a compressed video is disclosed. The method comprises scrambling the compressed video, to produce a scrambled compressed video; delivering the scrambled compressed video to a decoder, for decoding the scrambled compressed video to produce a scrambled decompressed video; receiving from the decoder the scrambled decompressed video; and descrambling the scrambled decompressed video, to produce a descrambled decompressed video.

20 Claims, 11 Drawing Sheets

(51) Int. Cl.
*H04N 19/48* (2014.01)
*H04N 19/40* (2014.01)
*H04N 21/426* (2011.01)
*H04N 21/4405* (2011.01)
*H04N 21/4408* (2011.01)

(56) References Cited

U.S. PATENT DOCUMENTS

| | | | |
|---|---|---|---|
| 2005/0155073 A1 | 7/2005 | Lecomte | |
| 2006/0072559 A1* | 4/2006 | LeComte | H04N 7/163 370/386 |
| 2008/0317118 A1* | 12/2008 | Bates | H04N 21/4147 375/240.01 |
| 2009/0116546 A1* | 5/2009 | Park | H04N 19/176 375/240.01 |
| 2014/0003503 A1* | 1/2014 | Chen | H04N 19/463 375/240.12 |
| 2015/0033008 A1* | 1/2015 | Einarsson | H04L 63/0428 713/150 |

OTHER PUBLICATIONS

S. G. Kwon, S.G. et al. "11 Digital Video Scrambling Using Motion Vector and Slice Relocation", Proc. 2nd ICIAR, vol. LNCS 3656, pp. 207-214 (2005).

Liu, S. et al. "Novel Format-Compliant Video Encryption Scheme for H.264/AVC Stream Based on Residual Block Scrambling", 4th Intl. Conf. on Wireless Communications, Networking and Mobile Computing, pp. 1087-1094 (2008).

Mooij, W. "Partial Digital Video Scrambling and its Applications", Intl. Broadcasting Conf.. 8 pgs. ( Sep. 2014).

Wiegand, T. "Editor's Proposed Draft Text Modifications for Joint Video Specification (ITU-T Rec. H.264 ISO/IEC 14496-10 AVC), Draft 7". JVT Meeting, 217 pgs. (Oct. 2002).

Extended European Search Report for EP Patent Appln. No. 13290312.1 (Apr. 14, 2014).

* cited by examiner

APPARATUS AND METHOD FOR DECODING COMPRESSED VIDEO

CROSS-REFERENCE TO RELATED APPLICATIONS

This application claims the priority under 35 U.S.C. §119 of European patent application no. 13290312.1, filed on Dec. 11, 2013, the contents of which are incorporated by reference herein.

This invention relates to the decoding of compressed digital video. It is particularly relevant to a software application for playing video, which uses a dedicated hardware decoder device to perform the decoding (decompression).

Video distribution over the internet is a rapidly growing market. So called "Over-The-Top" (OTT) content can be delivered over a broadband internet connection. Typically, this content is supplied by a third party, with the Internet Service Provider (ISP) being responsible only for transporting the underlying Internet Protocol (IP) packets. OTT services, in particular, represent a fast-growing market. They enable end users to enjoy video on Smart Devices such as Smartphones and Tablets. Recently, many software applications have been made available, for watching video over OTT services. However most of the content for these services is limited in quality and resolution—it is typically Standard Definition (SD) rather than High-Definition (HD).

Many Smart Devices are based on Open Operating Systems (such as Android). This enables developers to quickly build applications for the devices. However, the open nature of these operating systems may be of concern for content providers, who may be reluctant to provide high quality, high resolution content on such platforms without appropriate measures to protect the content from unauthorised copying. If suitable content-protection could be provided, content providers might be more willing to distribute high quality HD content.

One solution that has been suggested is to use a "trusted environment", in order to protect the full video-delivery path. An example of this is the "TrustZone®" technology developed by ARM Ltd. Such a solution can solve the problem of content protection, but it may be cumbersome to implement. In particular, the need for certificates and other strong security mechanisms in such an environment places an extra burden on software application developers, who may need to go through a certification process each time the software application is updated.

According to an aspect of the present invention, there is provided an apparatus for decoding a compressed video, the apparatus comprising:

a video scrambling unit, adapted to receive the compressed video and scramble it, to produce a scrambled compressed video;

a video decoder, arranged to receive the scrambled compressed video from the scrambling unit and adapted to decode it, to produce a scrambled decompressed video; and a video descrambling unit, arranged to receive the scrambled decompressed video from the video decoder and adapted to descramble it, to produce a descrambled decompressed video.

In this apparatus, the video is decoded (decompressed) in scrambled form. This can make it more difficult for a malicious user to copy the video, because the video is in scrambled form at both the input and the output of the video decoder.

The video scrambling unit is preferably adapted to scramble the compressed video in a manner that: does not prevent the decoding of the video by the video decoder; modifies the visual content of the scrambled decompressed video after decoding; and is reversible by the video descrambling unit, such that the descrambled decompressed video is identical or substantially identical to the video that would be produced if the compressed video were to be decoded by the video decoder, without scrambling.

Preferably the modification of the visual content creates a perceptible visual disturbance. This would make it annoying for a viewer to watch the scrambled decompressed video, thereby making it more difficult for a malicious user to make high-quality illicit copies of the video.

The scrambling is systematic in the sense that it is possible for the video descrambling unit to reconstruct (precisely or at least approximately) the decompressed video that would have been produced by the video decoder if no scrambling had been applied.

Preferably, no modification of the video decoder is required. This means that the compressed video and the scrambled compressed video can both be decoded by the video decoder in the same way. That is, the scrambling is transparent to the video decoder.

The descrambled decompressed video may be considered substantially identical to the corresponding decompressed video without scrambling if it contains the same number of frames and a majority of these frames are identical to their counterparts in the decompressed video to which scrambling has not been applied. Preferably, any frames that are not identical to their counterparts are visually similar to them.

Preferably, the video scrambling unit is adapted to produce scrambling metadata that describes a scrambling operation performed by the video scrambling unit; and the video descrambling unit is arranged to receive the scrambling metadata from the scrambling unit and adapted to use it to descramble the scrambled decompressed video received from the video decoder.

The scrambling metadata is preferably not provided to the video decoder.

The scrambling performed by the video scrambling unit may comprise one or more operations performed on individual Access Units of the compressed video.

That is, the modification does not treat all Access Units uniformly. At least some Access Units are treated differently—an operation that is performed on one Access Unit is different from an operation that is performed on at least one other Access Unit. An Access Unit may comprise the encoded representation of a single frame of the video, or part of a frame.

The scrambling performed by the video scrambling unit may comprise at least one of: changing an ordering of Access Units in the compressed video; inserting one or more additional Access Units into the compressed video; and removing one or more Access Units from the compressed video.

Preferably, changing the ordering of Access Units comprises changing their order of presentation without changing the order in which they are decoded by the video decoder.

Optionally, the video scrambling unit may be adapted to detect whether particular Access Units can be inserted, removed, or reordered without further adaptation of the compressed video. If further adaptation is necessary, the video scrambling unit is preferably adapted to perform this further adaptation.

The video scrambling unit may also be adapted to detect if Access Units cannot be inserted, removed, or reordered, even with further adaptation of the compressed video. If this is detected, the video scrambling unit may disable the scrambling for the relevant Access Units.

The video scrambling unit may be controlled to apply scrambling to first portions of the video and not to apply scrambling to second portions of the video.

The first and second portions are preferably selected randomly or pseudo-randomly.

The video decoder may comprise a hardware video decoder.

A hardware decoder is typically a separate electronic device (for example, a separate integrated circuit or "chip"), which is specifically designed to decode compressed video streams.

Preferably, the compressed video and the video decoder conform to a predetermined video coding standard; and the video scrambling unit is adapted to scramble the compressed video in such a way that the scrambled compressed video also conforms to the same video coding standard.

That is, the scrambling performed by the video scrambling unit does not break the conformance of the video bitstream with the video coding standard. The standard-conformant video decoder can then be used to decode the scrambled compressed bitstream.

The video decoder and the compressed video may conform to the H.264 standard and the scrambling may comprise modifying the Picture Order Count (POC) of a plurality of Access Units in the H.264 compressed video.

The modification of the POC preferably comprises at least one of: reordering the POC values of a set of Access Units; and multiplying the POC values of a set of Access Units by an integer. Reordering the POC values has the effect of permuting the original presentation order of the Access Units. Multiplying the POC values by an integer enables one or more additional Access Units to be inserted in between original Access Units.

As mentioned already above, the video scrambling unit may be adapted to detect whether particular Access Units can be inserted, removed, or reordered without further adaptation of the compressed video. If further adaptation is necessary, the scrambling unit is preferably adapted to perform this further adaptation. In the case of the H.264 standard, this adaptation may comprise modifying the syntax of the compressed video stream in other respects (in addition to modifying the POC of the Access Units).

The video scrambling unit may be adapted to: detect that the Picture Order Count is encoded implicitly in the compressed video and, in response: modify header information of the compressed video in order to signal that the Picture Order Count is encoded explicitly; and assign an explicit Picture Order Count value in each Access Unit of the compressed video.

In some H.264 video streams, the POC is implicit. By converting such streams to encode the POC, explicitly it becomes possible to scramble the video by modifying the POC.

The video scrambling unit may be adapted to detect in the compressed video a coding mode that would require the video decoder to use the Picture Order Count to decode one or more Access Units and, in response: disable the scrambling; or modify the compressed video no that the video decoder does not need to use the Picture Order Count to decode the one or more Access Units.

In general, the POC is not needed in the decoding process, but only determines the presentation (display) order of the frames after they have been decoded. However, in certain coding modes, the decoding of a frame is dependent upon its POC. In these modes, scrambling by modifying the POC may lead to decoding errors—for example, perceptible changes in the visual content of the decoded frames.

Detecting such a mode may comprise detecting a temporal prediction mode in which motion vectors are dependent on POC values (temporal direct prediction). Alternatively or in addition, detecting such a mode may comprise detecting a weighted prediction mode in which the weighted prediction is dependent on POC values.

The video scrambling unit may be adapted to: detect that the compressed video is encoded according to the Baseline Profile of the H.264 standard and, in response, modify the compressed video to convert it to another H.264 Profile.

That is, the video scrambling unit may be adapted to modify the syntax of the compressed video stream, in order to convert it from a conformant Baseline Profile bitstream into a bitstream that conforms to a different Profile, preferably Main Profile. In Baseline Profile, the presentation order of frames is typically the same as their decoding order. Therefore, if a Baseline Profile video were scrambled by modifying the POC of certain frames, a malicious user might be able to descramble the video by presenting the frames in the order that they were decoded. Converting the video to another Profile (in particular, Main Profile) may help to disguise the fact that the true presentation order is the same as the decoding order.

Also provided is a portable electronic device such as a mobile phone or tablet computing device, comprising an apparatus as summarised above.

The present invention may be particularly beneficial in such a device, because it is common for a video player to be provided as a software application on such a device. This application runs on a general purpose microprocessor or microcontroller. However, it is also common that a hardware accelerator (separate from the general purpose processor) is used to decode the compressed video, because the general purpose processor does not have enough processing power. Even if the video player application software and the hardware accelerator device are (individually) secure, it may be possible for a malicious user to intercept the video between the software application (general purpose processor) and the hardware accelerator. According to an embodiment of the present invention, the application software controls the general purpose processor to scramble the compressed video before sending it to the hardware accelerator, and controls the general purpose processor to descramble the scrambled decompressed video received from the hardware accelerator. That is, the functions of the scrambling unit and descrambling unit may be performed by the general purpose processor under the control of the video player application software.

According to another aspect of the invention, there is provided a method of decoding a compressed video, comprising:

scrambling the compressed video, to produce a scrambled compressed video;

decoding the scrambled compressed video, to produce a scrambled decompressed video; and descrambling the scrambled decompressed video, to produce a descrambled decompressed video.

Also provided is a non-transitory computer readable medium storing a computer program, the computer program comprising computer program code means adapted to perform all the steps of a method as summarised above when said program is run on a computer.

The invention will now be described by way of example with reference to the accompanying drawings, in which.

To consume High Quality HD video content on typical Smart Devices, it is desirable to use a hardware (HW) video decoder available in the Smart Device. This is because a software decoder, running on a general purpose processor in a Smart Device, may not have sufficient processing power to decode HD video. A typical system would be composed of a software (SW) video player (usually integrated in the application of the service provider) that will employ the HW video decoder of the platform to perform the actual decoding of the compressed video stream.

Figure 1:
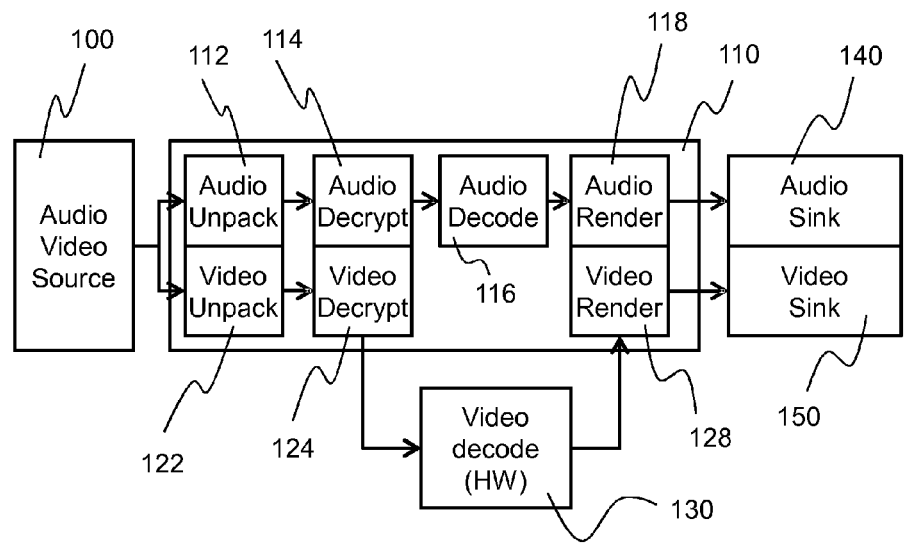
FIG. 1 shows a notional conventional video player.

An example of such a system is illustrated in FIG. 1. A stream of audio and video is delivered from a source 100 to a software video player 110. The software video player 110 is a software application, which runs on a general purpose processor of a smart device. In the software video player 110, the audio and video are handled by different processing paths. The audio stream is unpacked by an audio unpacking unit 112 and passed to an audio decryption unit 114 to be decrypted. The decrypted stream is decoded by audio decoder 116 before being passed to audio renderer 118. This outputs an audio signal which is delivered to an audio sink 140 (for example, a loud speaker). The video stream is unpacked by a video unpacking unit 122 and then decrypted by video decryption unit 124. The software video player 110 then sends the decrypted video to a hardware video decoder 130, for decoding. The decoded (uncompressed) video is sent back from the hardware video decoder 130 to the software video player 110 and is rendered by video renderer 128. The video signal output by the video renderer 128 is supplied to a video sink 150 (for example, the display screen of the smart device). As those skilled in the art will understand, the components 112-128 of the software video player 110 represent functional units of the software application, all of which are executed on the general purpose processor (not shown). However, the hardware video decoder 130 is a separate hardware device.

The Software Video Player 110 is typically protected by software security mechanisms, such as: code obfuscation, anti-debugging, anti-tampering, and anti-rooting. However, there are two points in this architecture where a malicious user could gain access to the content. Firstly, between the video decryption unit 124 and the hardware video decoder 130, the video is available unencrypted, in the compressed domain. Secondly, between the hardware video decoder 130 and the video renderer 128, the video is available unencrypted in the pixel domain.

The present inventors have recognised that it would be desirable to avoid the need for a trusted environment on the platform, yet still enable the secure distribution of High Quality HD video. The solution provided according to embodiments of the present invention is to put in place a video scrambling mechanism in the compressed domain and provide a video descrambling mechanism in the pixel domain. With this approach, if the content is obtained by a malicious user at the weak points identified above, it will be barely watchable due to the visual impairment created by the scrambler. In some embodiments, in order to make the system more robust to reverse engineering of the scrambled stream by a malicious user, a random control mechanism is used, in order to activate the scrambling mechanism at arbitrary moments in time.

Figure 2:
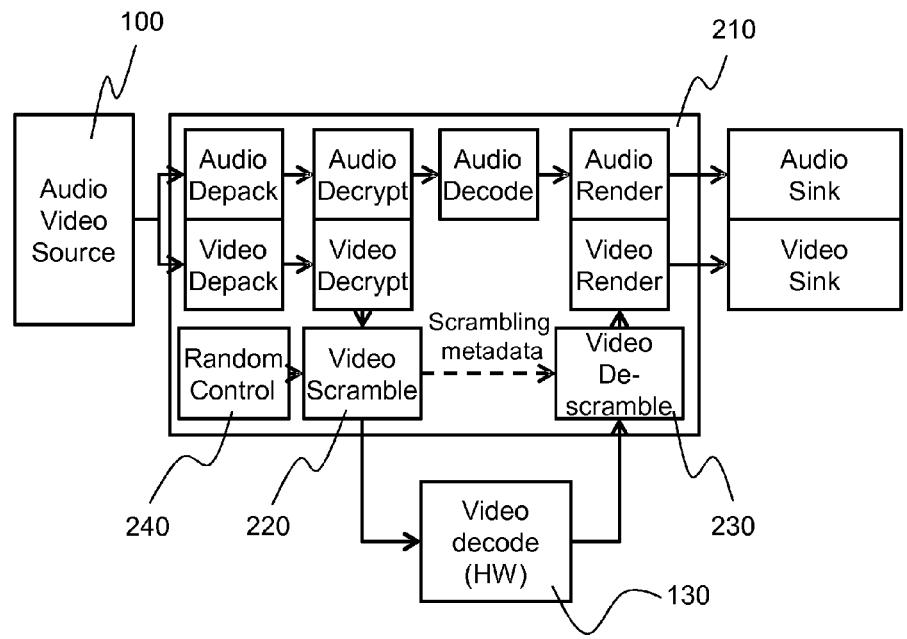
FIG. 2 shows a video player according to an embodiment of the invention.

FIG. 2 illustrates a software video player 210 according to an embodiment of the present invention. This is based on the architecture of FIG. 1. Unless otherwise specified, the shared components are similar and will not be described again. The main differences are that the software video player 210 comprises a video scrambling unit 220, a video descrambling unit 230, and a random control unit 240. The video scrambling unit 220 operates in the compressed domain. It receives a decrypted video compressed elementary stream as input, from the video decryption unit 124 and generates a scrambled video compressed elementary stream as output. This output is supplied to the hardware video decoder 130 (which can be identical to the decoder of FIG. 1). The video descrambling unit 230 operates in the pixel domain. It takes a scrambled decompressed video, received from the hardware video decoder 130, and generates a descrambled decompressed video based on scrambling metadata. The scrambling metadata is supplied from the video scrambling unit 220 to the video descrambling unit 230, inside the software video player 210. The output of the video descrambling unit 230 is supplied to the video renderer 128 for rendering. The random control module 240 controls the video scrambling unit 220, to randomly activate the scrambling process.

The video scrambling unit 220 and video descrambling unit 230 are integrated within the software video player 210 and can be protected by software protection mechanisms (some examples of which are known in the art).

Figure 3:
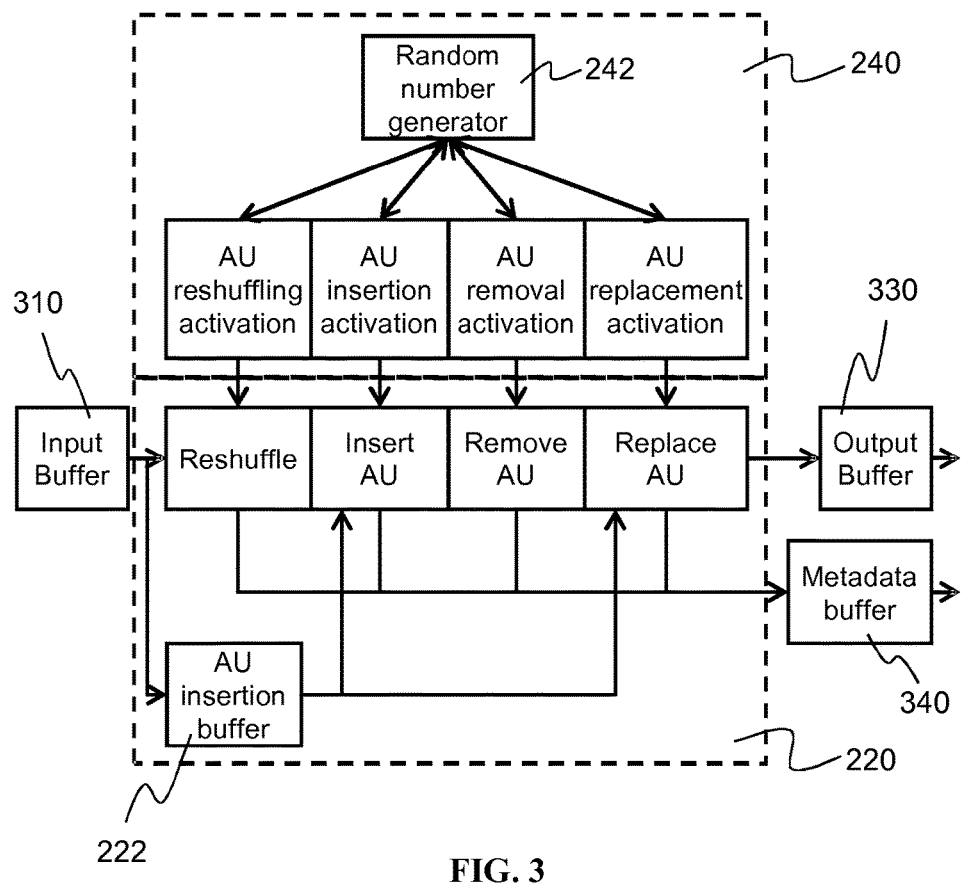
FIG. 3 shows the video scrambling unit of FIG. 2 in greater detail.

The video scrambling unit 220 processes Access Units (AUs) in the compressed domain and implements several scrambling mechanisms that can be performed independently or in combination. These include: video AU reordering (shuffling); video AU insertion; video AU removal; and video AU replacement. The functions of the random control module 240 and video scrambling unit 220 are illustrated in greater detail in FIG. 3. The control module 240 comprises a random number generator 242. The random numbers that it generates are used to control activation of the four scrambling mechanisms of the video scrambling unit 220. The video scrambling unit 220 receives AUs via an input buffer 310 (which receives them from the video decryption unit 124. From this buffer, the AUs are supplied to four functional modules that implement the reshuffling, insertion, removal, and replacement of AUs, respectively. The scrambled AUs are then output to an output buffer 330, from where they will be sent to the hardware video decoder 130. Metadata about the scrambling is generated in the functional modules. This scrambling metadata describes the operations that have been applied to the AUs (that is, how they have been modified in the scrambling processes). This scrambling metadata is output to a metadata buffer 340. From here, it is delivered to the video descrambling unit 230, which uses the scrambling metadata to reconstruct (descramble) the uncompressed video stream correctly. For insertion and replacement of AUs, additional AUs need to be provided. These are stored in an AU insertion buffer 222. In the present embodiment, the inserted AUs are copies of other AUs in the elementary stream.

Figure 4:
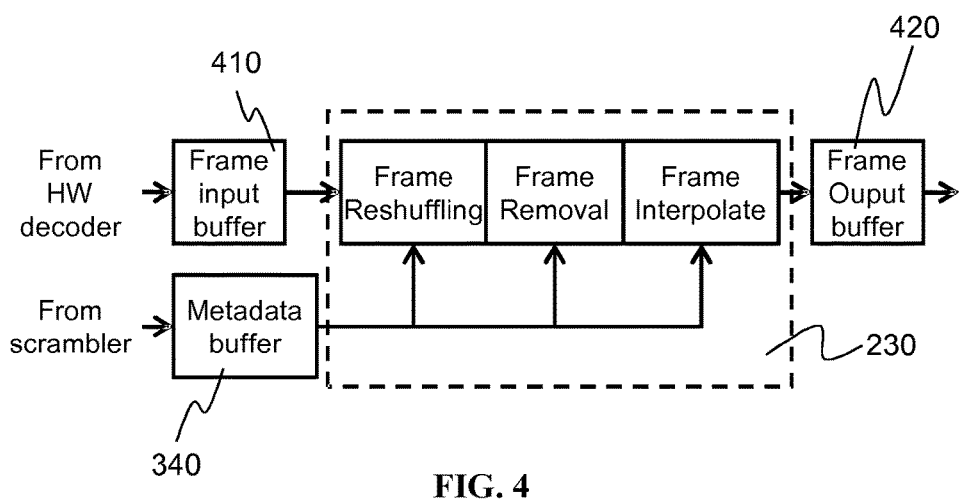
FIG. 4 shows the video de-scrambling unit of FIG. 2 in greater detail.

The video descrambling module 230 processes frames in the pixel domain and implements several descrambling mechanisms that are dependent on the scrambling mechanisms applied at the video scrambling unit 220. These include a frame re-shuffler; a frame discarder; and a frame interpolator. This is illustrated in FIG. 4. A frame input buffer 410 receives frames of the decompressed scrambled video from the hardware video decoder 130. The video descrambling unit 230 takes frames from this frame input buffer 410 and takes the scrambling metadata from the metadata buffer 340 as its inputs. It modifies the frames appropriately, to reverse the effects of the compressed-domain scrambling that was applied earlier. Frame-reshuffling undoes the AU reshuffling performed in the video scrambling unit 220. Frame-removal undoes the AU insertion performed in the video scrambling unit 220. Frame-interpolation undoes the AU removal performed in the video scrambling unit 220. The interpolation reconstructs the missing frame from neighbouring frames (for example, using known techniques for motion-interpolation). As such, the reconstructed frame might not be identical to the frame encoded in the AU that was removed. However, provided the differences are small, they may not be easily perceptible by a viewer.

Although any of four operations may have been carried out at the video scrambling unit 220, only three functional units are necessary to descramble the video. This is because AU replacement at the video scrambling unit 220 can be viewed as a combination of frame removal and frame insertion. Hence, it can be undone by a combination of frame removal and frame interpolation.

As used herein, an "Access Unit" (AU) means a logical substructure of an elementary stream. The elementary stream is a binary bitstream containing encoded (that is, compressed) video data. Each frame is a decoded (decompressed) version of a respective access unit.

"Compressed" video data means a representation of a video that does not comprise pixel data suitable for rendering on a display. It is preferably a more compact representation than the raw pixel data (in terms of the number of bits needed to represent the video). The compressed video data must be decoded in order to reconstruct pixel data suitable for rendering. In some embodiments the video is compressed using a block-based motion-compensated transform-coded compression method, such as those that will be familiar to those skilled in the art.

A detailed example will now be described, showing how the scrambling and descrambling operations can be implemented, using the H.264 video codec. Those skilled in the art will appreciate that the invention is not limited in scope to this codec and, by understanding the principles disclosed below, similar examples can be constructed for other codecs.

Figure 5:
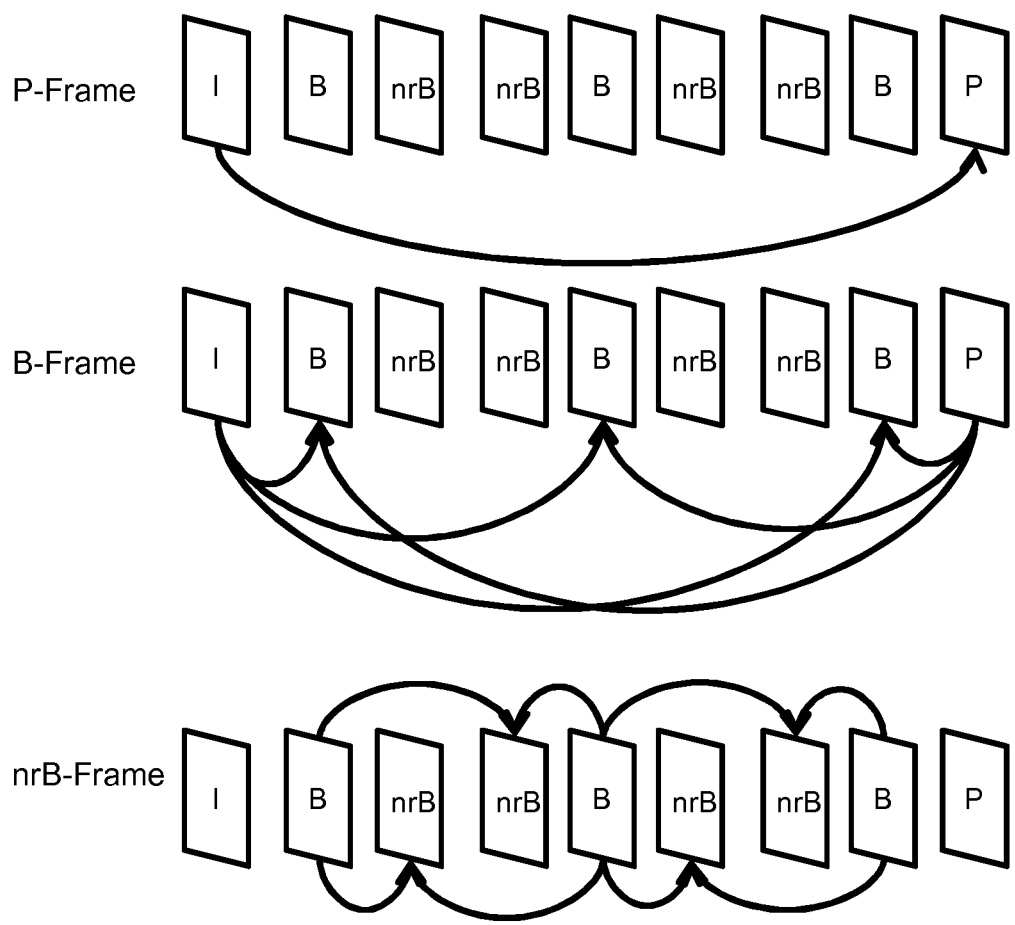
FIG. 5 illustrates the different frame-types used according to an embodiment of the invention.

The scrambling methods described below are dependent on the types of frames in the compressed domain. Those skilled in the art will be familiar with the usual types of compressed frames found in conventional motion-compensated coding schemes. The following is a brief summary of the types and their relevant characteristics. These are illustrated in FIG. 5.

Intra frame: ("I-frame") this type of frame is encoded without reference to any past or future frame. One particular type of I-frame is an Instantaneous Decoder Refresh (IDR) frame. No frame received after an IDR frame can use any frame before the IDR frame as a reference frame for decoding.

Predicted frame: ("P-frame") a frame that is encoded with reference to a past frame. This type of frame can also be used as a reference frame for one or more subsequently decoded frames.

Bidirectional Predicted frame: ("B-frame") a frame that is encoded with reference to past and/or future frames.

A distinction can be drawn between frames that will be used as reference frames in the decoding process and those that will not be used as reference frames in the decoding process. In the case of H.264, this applies mostly to B-frames but also occasionally to P frames. We can make the distinction between B-frames (and P-frames) that will be used as references for the coding of other frames and B-frames (and P-frames) that will not be used as reference for the coding of other frames. Where required, for the sake of clarity, the former will be called "rB-frames" (respectively "rP-frames") and the latter will be called "nrB-frames" (respectively "nrP-frames").

The scrambling methods are such that the stream resulting from the scrambling mechanism remains conformant with the syntax of the coding scheme. In other words, it remains a valid encoded bitstream, according to the definition of the codec. This is desirable to avoid errors in the HW decoder and so that the decoder does not require modification.

The scrambling methods are applied in the compressed domain but are reversible in the pixel domain. Performing the scrambling does not require decoding of the received frames—instead, the scrambling operates on higher level syntax elements of the compressed video stream.

The Picture Order Count (POC) is used in the decoding process to identify the presentation (display) order of each of the decoded frames. Because of the use of bidirectional prediction the decoded frame order is different from the display order—the reference frames for a B-frame must be decoded before the B-frame itself, even though the B-frame occurs at an earlier presentation instant. POC is usually embedded in the high level syntax of an encoded frame and is used in the last step of the decoding process, to properly reorder the frames according to their display order. The scrambling processes described below manipulate the POC of a plurality of frames (optionally in addition to other modifications).

Figure 6:
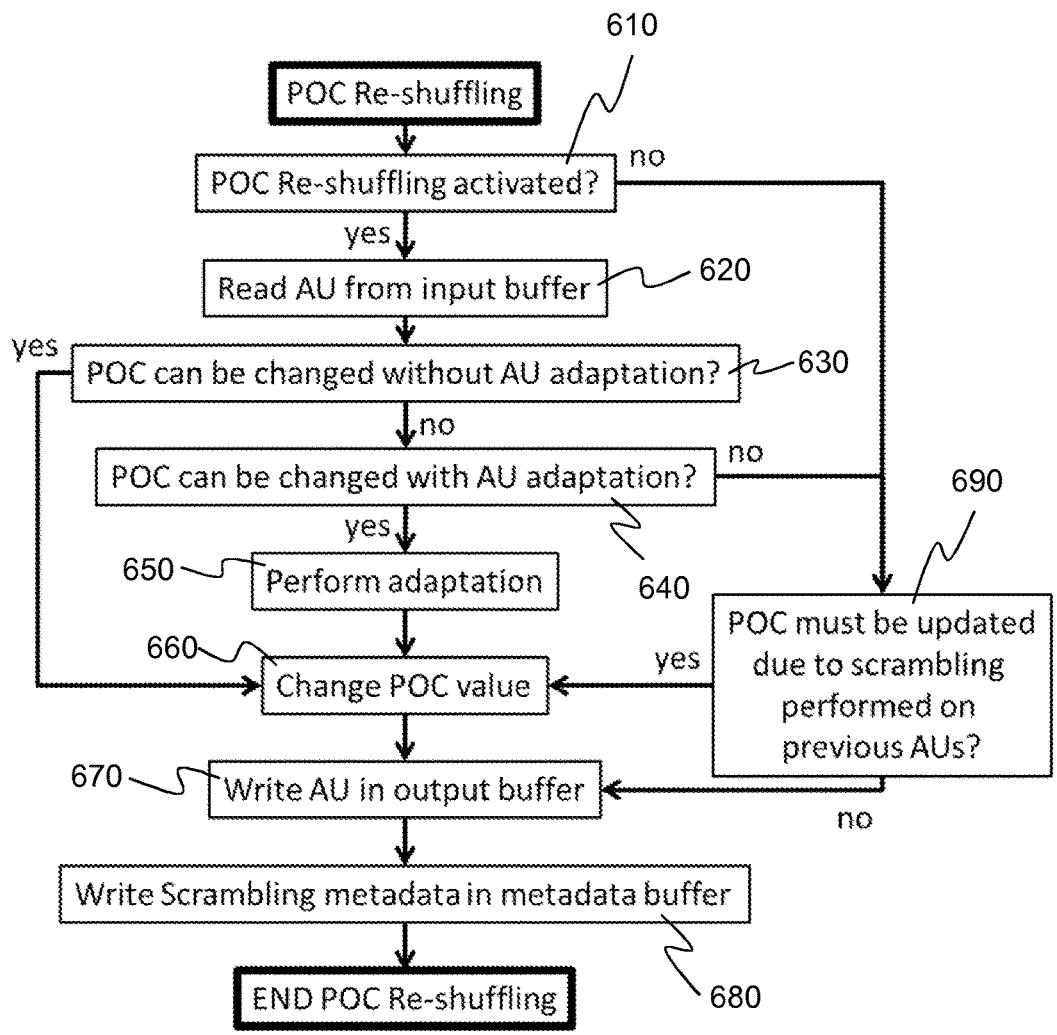
FIG. 6 is a flowchart illustrating scrambling by reshuffling.

Scrambling by reordering is illustrated in FIG. 6. The principle is to rearrange the presentation order of some of the frames, by changing the POC value embedded within each Access Unit. If not compensated for (at the video descrambling unit 230) this creates visual annoyance in the form of strong judder. The more motion is present in the video content, the more pronounced the annoyance. The corresponding descrambling process reorders the frames appropriately. A constraint applies for AUs that encode reference frames: if a re-ordered AU is used as reference, its reference index shall be maintained so that AUs using it as a reference AU in their decoding process are properly decoded.

The reshuffling procedure starts in step 610, in which the video scrambling unit 220 checks if reshuffling has been activated by the random control unit 240. If so, the next AU is read from the input buffer 310, in step 620. Next, in step 630, the video scrambling unit 220 checks if the POC can be changed without additional modification of the AU. If so, the method proceeds to step 660 and the POC value is changed. If the POC cannot be changed without further adaptation of the AU, the method proceeds to step 640 and the scrambling unit checks if the POC can be changed in conjunction with further adaptation of the AU. If so, the method proceeds to step 650 and the necessary additional adaptation of the AU is performed. The method then continues to step 660. After step 660, the AU with its modified POC value is written into the output buffer 330, in step 670. In step 610, if the video scrambling unit 220 determines that reshuffling has not been activated, the method proceeds to step 690. The method can also proceed to step 690 if it is determined in step 640 that the POC cannot be changed (even with additional adaptation of the AU). In step 690, the video scrambling unit 220 checks whether the POC must be updated due to scrambling that was performed on previous AUs. (Scrambling applied to the POC values of earlier AUs can have a knock-on effect on the POC values of later AUs, even if these later AUs are not themselves scrambled.) In this case, the method proceeds to step 660, to update the POC values. Otherwise, the method proceeds directly to step 670, to write the AU into the output buffer 330. Lastly, in step 680, scrambling metadata is written to the metadata buffer 340. The procedure is repeated for each access unit. After the final access unit, the reshuffling procedure ends.

Figure 7:
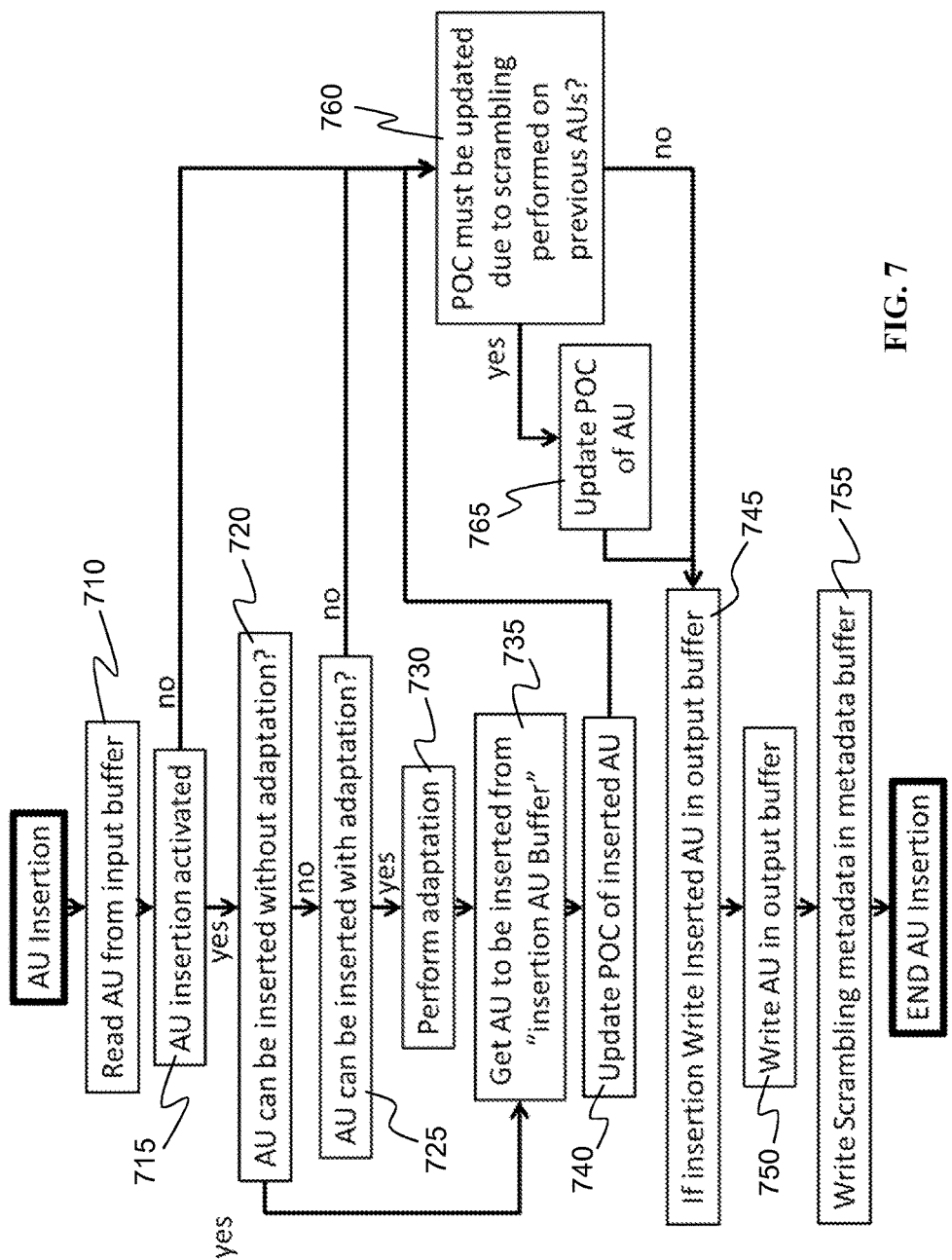
FIG. 7 is a flowchart illustrating scrambling by AU insertion.

Scrambling by AU insertion is illustrated in FIG. 7. The principle is to insert AUs between existing AUs in the compressed domain. If the content of the inserted AUs is relatively uncorrelated with the adjacent AUs it will create strong visual discontinuities, causing annoyance (if not removed by the appropriate descrambling). The less motion is present in the content the more annoyance will be created. The descrambling process comprises removing the additional inserted frames. Preferably, the AUs inserted should not be easily identifiable (to a malicious user). Ideally, the inserted AU would be different at each insertion. A constraint is that the inserted AUs shall not be used as a reference for the decoding of the original encoded frames in the stream. If an original frame were to be decoded using an inserted frame as a reference frame, its decoding process would be corrupted. To avoid this in the present embodiment, the system ensures that inserted frames do not get into the reference buffer, by using only an nrB or an nrP AU present in the stream. Alternatively or in addition, the system could insert a continuous set of AUs whose decoding is self-contained. However, in the latter case, this can only be performed immediately before an IDR frame, as exemplified below.

The input stream structure is:
IDR P P P P P P B P B P IDR P B P B

The output stream structure, after the insertion of a self-contained Group of Pictures (GOP) [IDR P P P] before the second IDR frame, is:
IDR P P P P P P B P B P [IDR P P P] IDR P B P B Because the GOP is inserted immediately before an IDR frame, none of the subsequent frames will refer to frames in the inserted GOP as reference frames. In order that decoding of the inserted GOP is self-contained, the inserted GOP itself also begins with an IDR frame.

With reference to FIG. 7, the insertion process begins and an AU is read from the input buffer 310, in step 710. Next, in step 715, the video scrambling unit 220 checks whether AU insertion has been activated by the random control unit 240. If AU insertion has been activated, the method proceeds to step 720 and the video scrambling unit 220 checks whether an AU can be inserted without additional adaptation of the elementary stream. If so, the method proceeds to step 735 and the AU to be inserted is read from the AU insertion buffer 222. The POC of the inserted AU is updated in step 740. After that, the method proceeds to step 760 and the scrambling unit checks whether the POC must be updated due to scrambling that was performed on preceding AUs. If so, the POC is updated in step 765 and the method proceeds to step 745. If not, the method proceeds directly to step 745. In step 745, if an AU has been inserted, the inserted AU is written into the output buffer 330. The method then proceeds to step 750, wherein the original AU (read from the input buffer in step 710) is written into the output buffer 330. Finally, the scrambling metadata is written into the metadata buffer 340, in step 755. In step 715, if the scrambling unit determines that AU insertion has not been activated, the method proceeds to step 760. In step 720, if the scrambling unit 220 determines that an AU cannot be inserted without additional adaptation of the elementary stream, the method proceeds to step 725. In step 725, the video scrambling unit 220 checks whether an AU can be inserted in conjunction with additional adaptation of the bitstream. If so, the necessary adaptation is performed in step 730 and the method proceeds to step 735. If an AU cannot be inserted even with additional adaptation of the stream, the method proceeds from step 725 to step 760. This procedure is performed for each AU in the sequence. When all AUs have been processed, the procedure ends.

Scrambling can also comprise removal of AUs, which is the reverse of inserting AUs and is relatively straightforward to implement. AUs are read from the input buffer 310 and copied to the output buffer 330 unless they are to be removed. That is, only the AUs not being removed are written to the output buffer 330. In general, there is no need to change the POC value of each AU, except when it needs to be updated as a consequence of scrambling that was applied to earlier AUs in the video. Visual annoyance is created because the frame rate of the content is reduced. The descrambling process comprises reconstructing the frames corresponding to the missing AUs, in the pixel domain, by means of motion-based frame-interpolation. Because reconstruction by interpolation is not perfect, the final rendering might contain some visual artefacts related to the re-interpolation process. Preferably, AUs that will be used as reference frames for decoding other frames are not removed. That is, only nrB or nrP AUs are removed.

Figure 8:
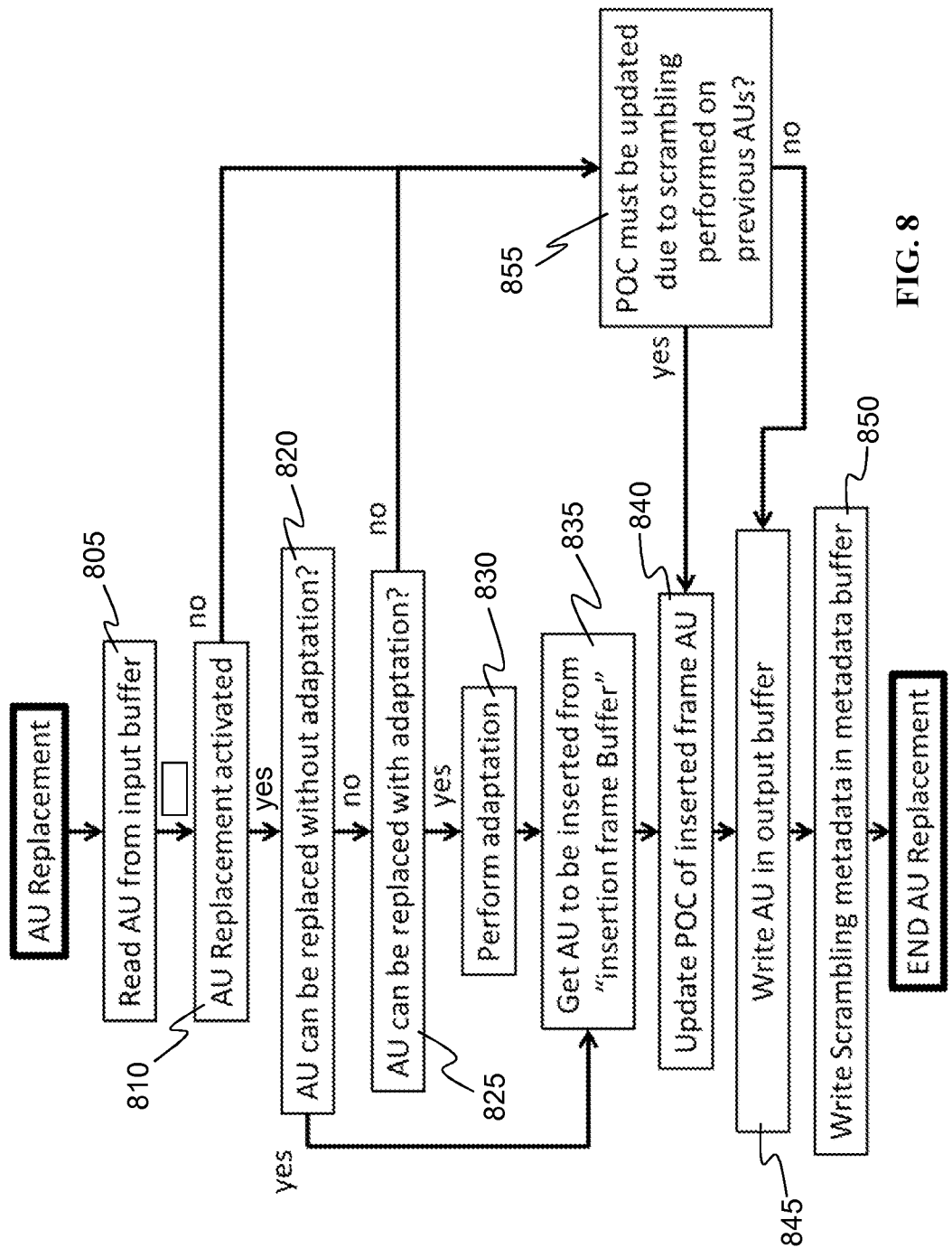
FIG. 8 is a flowchart illustrating scrambling by AU replacement.

Scrambling by AU replacement is illustrated in FIG. 8. The principle is to combine AU removal and AU insertion. With reference to FIG. 8, when the AU replacement scrambling process starts, an AU is read from the input buffer 310, in step 805. Next, the video scrambling unit 220 checks, in step 810, whether AU replacement has been activated by the random control unit 240. If so, the method proceeds to step 820. In step 820, the video scrambling unit 220 checks whether this AU can be replaced without additional adaptation of the stream. If so, the method proceeds to step 835 and the AU to be inserted in place of the current AU is read from the AU insertion buffer 222. The method then proceeds to step 840. Here, the POC of the inserted frame AU is updated. Next, in step 845, the (inserted) AU is written into the output buffer 330. Lastly, in step 850, the corresponding scrambling metadata is written into the metadata buffer 340. If the scrambling unit determines, in step 820, that the AU cannot be replaced without additional adaptation of the stream, the method proceeds to step 825 and the scrambling unit checks whether the AU can be replaced in conjunction with additional adaptation. If so, the method proceeds to step 830 and the necessary additional adaptation is performed. After that, the method proceeds to step 835, as before. In step 810, if AU replacement has not been activated, the method proceeds to step 855 and the video scrambling unit 220 checks whether the POC needs to be updated because of scrambling that was performed on preceding AUs. If so, the method proceeds to step 840 and then step 845. If not, the method proceeds directly to step 845, wherein the (original) AU is written into the output buffer. In step 825, if the current AU cannot be replaced even in conjunction with additional adaptation of the stream, the method also proceeds to step 855. After the process has been performed for each AU, the process ends.

Figure 9:
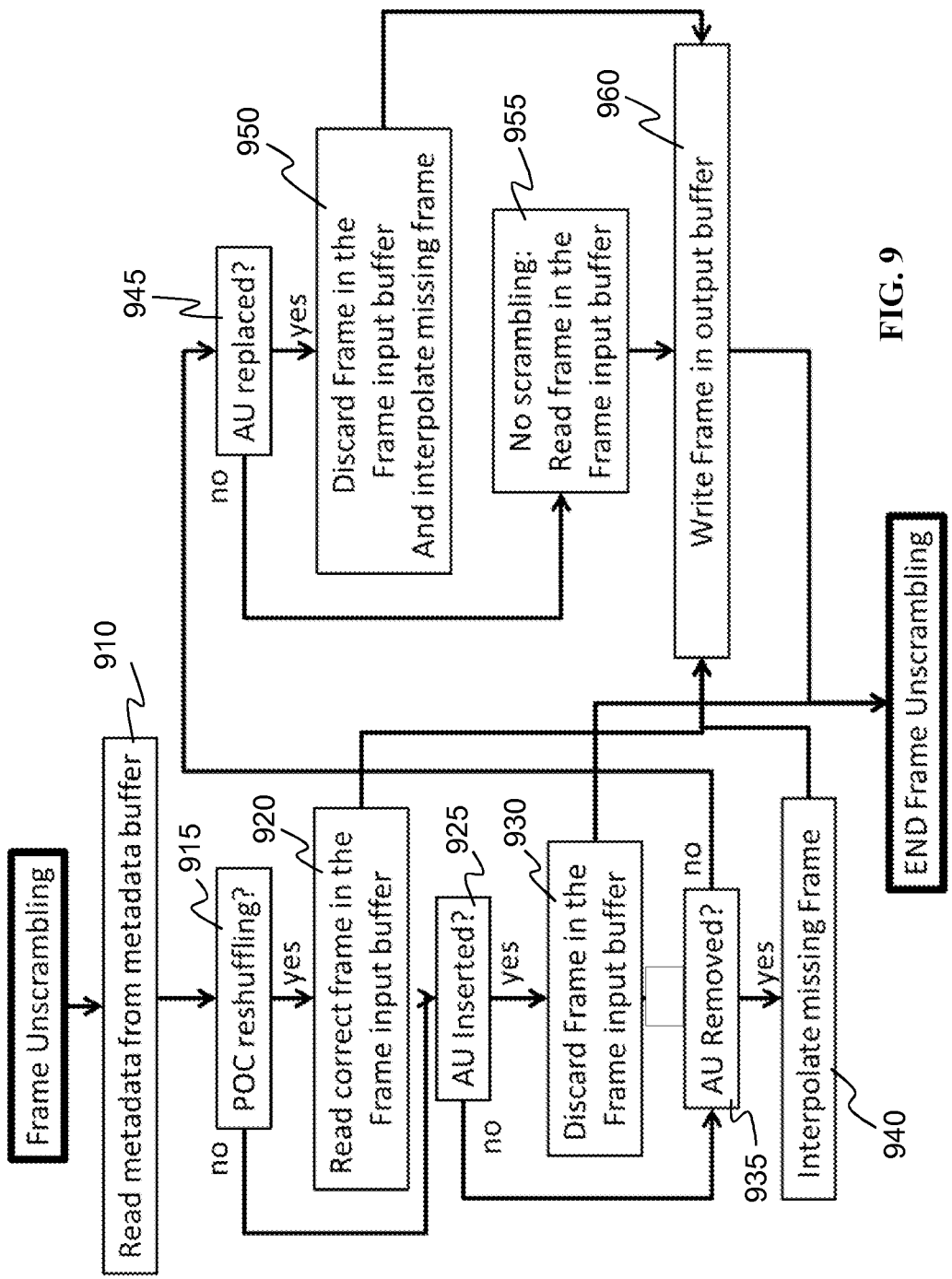
FIG. 9 is a flowchart illustrating a descrambling procedure.

FIG. 9 outlines the descrambling process. When descrambling begins, the video descrambling unit 230 reads scrambling metadata from the metadata buffer 340, in step 910. Next, in step 915, the video descrambling unit 230 checks (using the metadata) whether POC reshuffling was performed by the video scrambling unit 220. If POC reshuffling has occurred, the method proceeds to step 920 and the video descrambling unit 230 reads the correct frame from the frame input buffer 410. From here, the method proceeds to step 960 and the frame is written into a frame output buffer 420. If there was no POC reshuffling, the method proceeds to step 925 and the descrambling unit checks whether an AU has been inserted. If so, the method proceeds to step 930 and the next frame in the frame input buffer 410 is discarded. If no AU has been inserted, the method proceeds instead to step 935 and the video descrambling unit 230 checks if an AU has been removed. If so, the missing frame is reconstructed by interpolation, in step 940. From here, the method proceeds to step 960 and the interpolated frame is written into the frame output buffer 420. If an AU has not been removed, the method proceeds instead to step 945 and the video descrambling unit 230 checks whether an AU has been replaced. If so, the method proceeds to step 950. The next frame in the frame input buffer 410 is discarded and the missing frame is reconstructed by interpolation. Once again, the method proceeds to step 960 and the interpolated frame is written into the frame output buffer 420. If there has been no AU replacement, the method proceeds from step 945 to step 955. This means that scrambling was not performed on this part of the video. The next frame is read from the frame input buffer 410 and the method proceeds directly to step 960, wherein this frame is written into the frame output buffer 420. After all frames have either been discarded in step 930 or written into the output buffer in step 960, the process ends.

A specific implementation of the scrambling processes will now be described in greater detail, for a compressed video encoded according to the H.264 standard. In particular, examples will be given of how to implement scrambling by reshuffling and scrambling by frame insertion, for a H.264-encoded stream. Where a variable is used without being otherwise defined here, it may be assumed that the variable is defined in the H.264 standard and is present in the compressed video bitstream. The H.264 standard is defined in ITU-T Recommendation H.264, "Advanced video coding for generic audiovisual services". This is the same as the standard known as MPEG-4 AVC, defined in ISO/IEC 14496-10, "Information technology—Coding of audio-visual objects—Part 10: Advanced Video Coding". In case of any ambiguity, references to the standard should be taken to refer to the version, revision, or edition of the standard in force at the priority date of the present invention. However, it is customary that later versions of such standards are backwardly compatible with earlier versions—the later versions extend the standard, while retaining the normative elements of the earlier versions. Therefore, it is to be expected that no ambiguity will arise and that a bitstream that conforms to any future version of the standard will also conform to the version in force at the priority date.

Some preliminary information is helpful to understand the details of how the scrambling is implemented.

The Picture Order Count (POC) is used in the H.264 decoding process to identify the display order (that is, presentation order) of each decoded frame. For bidirectional prediction, in particular, the order in which frames are decoded may be different from the order in which they are displayed. One way to imply a reshuffling of the decoded frames is to modify the POC within the encoded stream. The POC of each AU is either encoded explicitly in the stream (mode 0) or implicitly determined during the decoding process (mode 1 and mode 2). Since the scrambling will change the POC within the stream, if the decoding is implicit it is necessary to convert from one of the implicit modes (mode 1 and mode 2) to the explicit mode (mode0). For further details of how the POC is retrieved during the H.264 decoding process, the reader is referred to the document "H.264/AVC Frame and picture management" (lain G. Richardson, January 2004), available online at: www4.rgu.ac.uk/files/avc_picmanagement_draft1.pdf. This information will already be familiar to those skilled in the art.

There are two decoding modes in which the motion compensation step performed by the hardware video decoder 130 will be dependent on the POC value. These are the "temporal direct prediction" and "weighted prediction" modes. Because the POC is not merely used to determine the presentation order, in these modes, their use must be detected by the video scrambling unit 220, in order to take them into account for the modification of the POC.

The H.264 baseline profile is a specific profile where there is no bidirectional prediction. In that case, the encoded video stream consists exclusively of I-frames and P-frames. The decoding order will usually be identical to the display order. Consequently, for a baseline profile stream, it will usually be easy for a malicious user to detect and undo any reshuffling of the display-order of the decoded frames. One way to overcome this problem is to convert the baseline profile stream into a main profile stream. This can be done merely by changing the high level semantics of the stream—for example, modifying header information. It is not necessary to decode and re-encode the video to convert from baseline to main profile.

The implementation of the scrambling process will now be described. For clarity and simplicity, the explanation below does not mention the activation and de-activation of the scrambling by the random control module.

If the POC signalling is implicit (mode 1 or mode 2) the compressed video bit stream is modified so that the signalling becomes explicit (mode 0). This can be performed in two steps. Firstly, the sequence_parameter_set data structure is modified in two respects:

pic_order_cnt_type=0
log 2_max_pic_order_cnt_lsb_minus4=4

The sequence_parameter_set (SPS) is a header data structure defined in the H.264 standard. For the reader's convenience it is reproduced in the appendix, below. The parameters in this header define how subsequent AUs in the stream are encoded (until the next occurrence of sequence_parameter_set). Note that the value of log 2_max_pic_order_cnt_lsb_minus4 shall be in the range of 0 to 12, inclusive.

Secondly, for each AU, modify the slice_header data structure to assign an explicit POC value in pic_ order_cnt_lsb. The slice_header is a header data structure defined in H.264, which describes how a "slice" is encoded. Typically, there is one slice for each AU, but it is possible to encode an AU as a plurality of slices, wherein each slice represents a portion of the video frame.

To perform the scrambling, the compressed video stream is parsed AU by AU. The scrambling method operates on groups of consecutive AUs of the same type. Each such group will be denoted herein as an "edit_gop". The POC values of AUs within the edit_gop are manipulated and frames are inserted within the edit_gop. Limiting POC manipulation to a group of consecutive AUs of the same type helps to avoid a situation in which AUs refer to the wrong reference AUs, in the decoding process. In the present embodiment, each edit_gop is limited in size, to contain a maximum of 8 consecutive AUs. This is to limit the processing delay that could be introduced by the scrambling and descrambling. If more than 8 AUs of the same type occur consecutively in the compressed stream, then these will be subdivided into several consecutive edit_gops of the same type.

The following is an example. Consider the following stream structure:

I nrB nrB P nrB nrB P P P B B

This stream will be divided into of 6 edit_gops:
Edit_gop_1: I
Edit_gop_2: nrB nrB
Edit_gop_3: P
Edit_gop_4: nrB nrB
Edit_gop_5: P P P
Edit_gop_6: B B The following variables are used in the course of the scrambling process:

Edit_gop_type: indicates the type of AU (for example, I, rP, nrP, rB, nrB) of the consecutive AUs within the edit_gop.

Edit_gop_size: the number of consecutive AUs of the same type that constitute the edit_gop.

Edit_gop_count: the number of edit_gops processed so far. This is used in the case of frame-insertion, in order to refresh the origin of the nrB frame that is being inserted into the stream. In other words, after a specified number of edit_gops has been processed, a new nrB AU from the compressed video stream will be copied into the AU insertion buffer 222.

Get_nrb_to_insert: Boolean variable (that is, a binary variable, which can assume the value "TRUE" or the value "FALSE"). When TRUE, this indicates that an nrB frame should be copied to the AU insertion buffer 222 for later use as an inserted AU.

First_AU_in_edit_gop: Boolean variable that, when TRUE, indicates that the currently processed AU is the first one of the edit_gop.

nextAU_type: indicates the type of the AU in the stream following the AU currently being processed.

Direct_spatial_mv_pred_flag: an H.264 parameter present in the stream, which defines the type of direct prediction used in motion prediction. For additional explanation, see also: http://wiki.multimedia.cx/index.php?title=Motion_Prediction Nr_gop: refers to an edit_gop constituted of non-reference AUs Sub_edit_gop: a subset of an edit_gop excluding the first AU and last AU of the edit_gop (in some cases it is preferable not to scramble the AUs at the start and end of an edit_gop, respectively).

POC_list: a list of all the POC values of the AUs constituting the sub_edit_gop.

New_POC_list: this contains a reshuffling of the POC list.

Poc_org: the original POC value of an AU, referred to within the POC_list

Poc_new: the reshuffled POC value of an AU, referred to within the New_POC_list

Org_flag: Boolean value indicating if the current AU was in the original stream. This is used to distinguish inserted AUs from original AUs, in the output scrambled stream.

Figure 10:
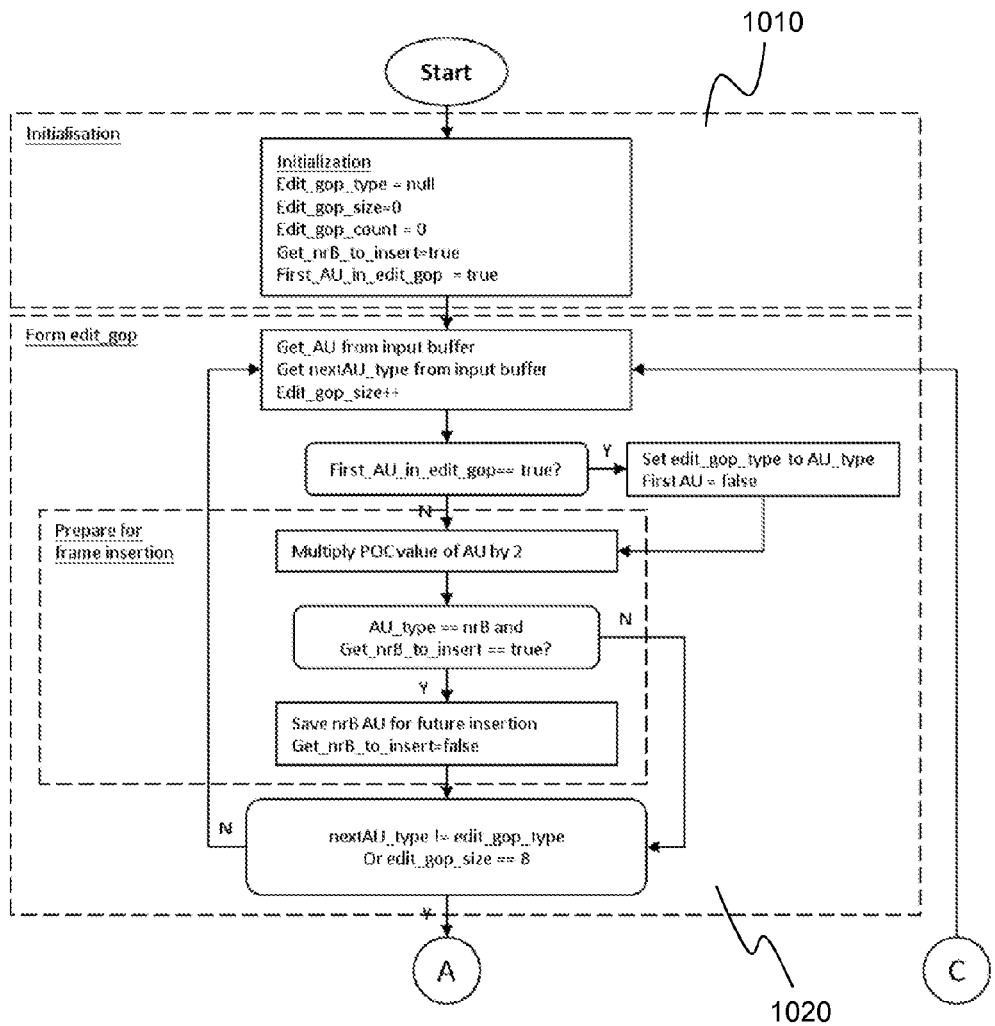
FIG. 10 is a pseudo-code flowchart illustrating the initial steps of a scrambling method for a video encoded using H.264.

FIG. 10 is a pseudo-code flowchart illustrating the first stages of the scrambling process performed by the video scrambling unit 220, according to the present embodiment. Firstly, in step 1010, the variables needed to perform scrambling are initialised. Then, in step 1020, the edit_gop is constructed, using the AUs sequentially received via the input buffer 310. To prepare for frame insertion, the POC value of each AU is multiplied by 2. The first nrB AU detected is saved into the AU insertion buffer 222, for later use as an inserted frame. Construction of the edit_gop continues until either the maximum size (8 AUs) is reached, or an AU of a different type is retrieved from the input buffer 310.

Figure 11:
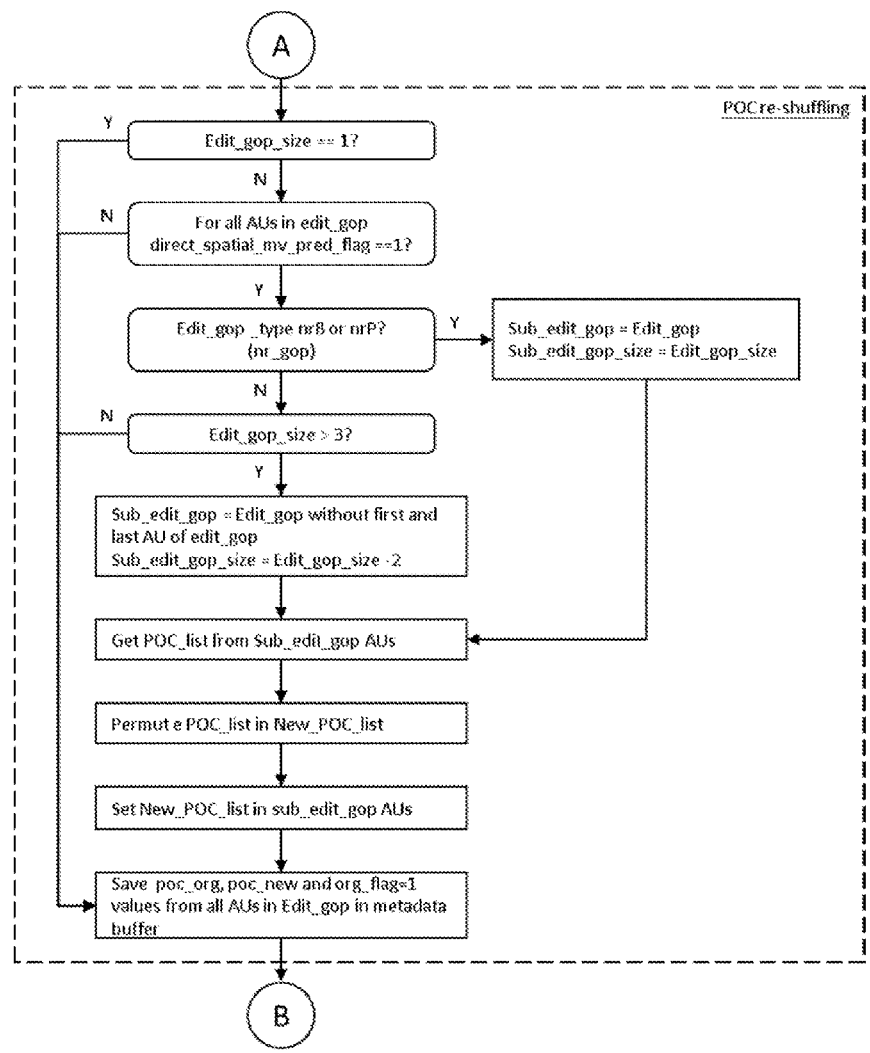
FIG. 11 is a pseudo-code flowchart continuing from FIG. 10, illustrating scrambling by reshuffling.

FIG. 11 is a pseudo-code flowchart illustrating the scrambling of the edit_gop by reshuffling. If the edit_gop contains just one AU, it cannot be reshuffled. Likewise, if all AUs in the edit_gop use temporal direct prediction (Direct_spatial_mv_pred_flag=1), no reshuffling is performed. If the edit_gop consists of nrB or nrP frames (that is, if the edit_gop is an nr_gop) all AUs in the edit_gop may be reshuffled. Otherwise, the first frame and last frame of the edit_gop are excluded from the reshuffling. In this latter case, the edit_gop must contain more than 3 frames in order for reshuffling to be possible. The reshuffling is achieved by making the new_POC_list a random permutation of the POC values in the POC_list. In other words, the original set of POC values is reassigned to the various AUs in a random order. The values of poc_org and poc_new for each AU in the edit_gop are written to the metadata buffer 340. Org_flag is set to TRUE and this variable is also written to the metadata buffer 340, for each AU.

Figure 12:
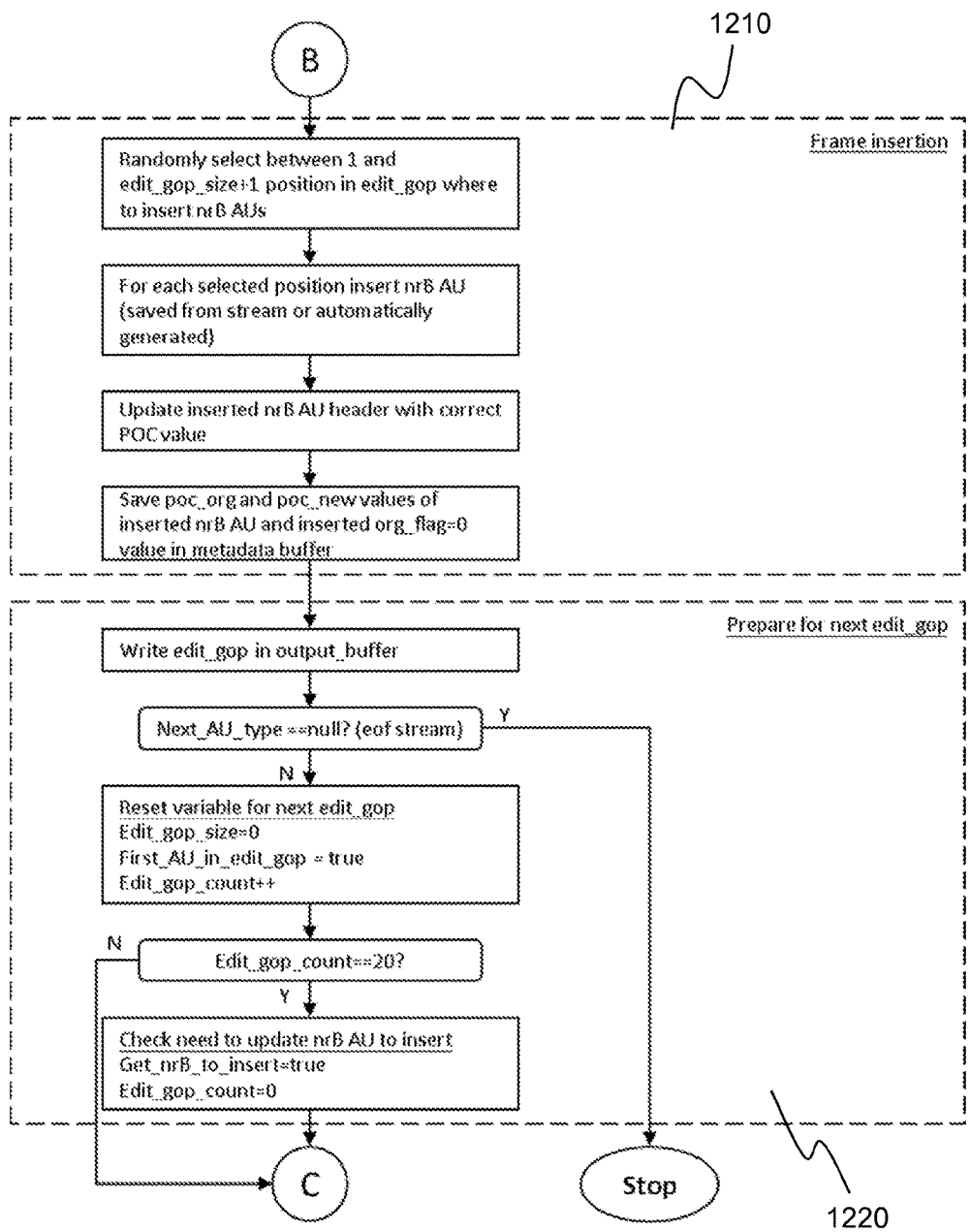
FIG. 12 is a pseudo-code flowchart continuing from FIG. 11, illustrating scrambling by frame insertion.

FIG. 12 is a pseudo-code flowchart illustrating the scrambling of the edit_gop by frame-insertion. Frame insertion is performed in step 1210, and the scrambling unit prepares for the next edit_gop in step 1220.

In step 1210, the video scrambling unit 220 randomly selects positions in the sequence of AUs where additional frames should be inserted. At each selected position, the nrB AU that is stored in the AU insertion buffer 222 is inserted into the sequence. Alternatively, the AU to be inserted can be automatically generated—that is, a synthetic AU can be inserted instead of inserting a copy of another AU from the same stream. The POC value of the inserted AU is updated with the correct POC value. The values of poc_org and poc_new for each inserted AU are written to the metadata buffer 340. Org_flag is set to FALSE and this variable is also written to the metadata buffer 340, for each inserted AU.

In step 1220, the edit_gop is written to the output buffer 330. The video scrambling unit 220 checks if there are any more AUs to process. If not, the process terminates. If there are still more AUs to process, the variables used in the scrambling are reinitialised. If 20 edit_gops have been processed since the contents of the AU insertion buffer were last refreshed, the flag get_nrB_to_insert is set to TRUE. The process then returns to step 1020 in FIG. 10.

In certain cases, special care should be taken, to avoid interfering with the decoding of the scrambled compressed video.

In a first example, special care is taken when handling a stream that incorporates temporal prediction. The H.264 parameter direct_spatial_mv_pred_flag specifies the method used in the decoding process to derive motion vectors (MVs) and reference indices for inter prediction as follows:

If direct_spatial_mv_pred_flag is equal to 1, the derivation process for luma motion vectors for B_Skip, B_Direct_16×16, and B_Direct_8×8 shall use spatial direct mode prediction. In this case, the direct prediction is spatial and does not depend on AU POC values. This means that POC reshuffling is possible and frame insertion is possible.

Otherwise—that is, if direct_spatial_mv_pred_flag is equal to 0—the POC values of the first reference frame in both reference lists (List0 and List1) and the POC value of B frames are in involved in the process of calculating the MV value when the macro-block (MB) type is one of: B_Skip, B_Direct_16×16, or B_Direct_8×8. (The reference lists are lists of reference frames for the decoding process, as specified by the H.264 standard.) In this case, the direct prediction is temporal and the AU POC values are involved in the motion vector calculation. This means that POC reshuffling is possible in certain cases, and frame insertion is possible under the condition that all POC values were originally multiplied by 2.

In particular, for POC re-shuffling in the case of temporal direct prediction (that is, when direct_spatial_mv_pred_flag is equal to 0):

For an nr_gop consisting of nrB frames, the POC values should not be reshuffled;

For an r_gop consisting of B frames, the POC values should not be reshuffled;

For an r_gop consisting of I/IDR/P frames, the POC modification algorithm could—in principle—still be applied to some AUs of the edit_gop, since only the first and the last AU in the edit_gop may be involved in the process of calculating MV values, inside the decoder. However, the value of direct_spatial_mv_pred_flag is present in the slice_header, so it can change for every slice within the edit_gop. In principle, it would be possible to re-shuffle the POC values in such an edit_gop, but this would require checking the value of direct_spatial_mv_pred_flag for every slice and properly computing the re-shuffling of the POC. Therefore, in order to avoid introducing excessive delay into the system, the present method does not re-shuffle POC values if any of the slices in the edit_gop have a direct_spatial_mv_pred_flag that is equal to 1.

For frame insertion, a single procedure is applied irrespective of the value of direct_spatial_mv_pred_flag. The POC value of each frame is multiplied by 2, which enables the scrambling unit 220 to insert frames without affecting the motion vector calculation in the decoder, for any value of direct_spatial_mv_pred_flag and for any type of edit_gop.

In a second example special care needs to be taken when handling a stream that incorporates weighted prediction. There are three possible modes of weighted prediction defined in the H.264 standard. The value of weighted_bipred_idc shall be 0, 1, or 2. These modes are defined as follows:

weighted_bipred_idc equal to 0 specifies that the default weighted prediction shall be applied to B slices.

weighted_bipred_idc equal to 1 specifies that explicit weighted prediction shall be applied to B slices.

weighted_bipred_idc equal to 2 specifies that implicit weighted prediction shall be applied to B slices.

In the first two cases (0 and 1), prediction is not dependent on the POC values of other frames and POC reshuffling and frame insertion can be performed.

For POC-reshuffling in the third case, when weighted_bipred_idc is equal to 2, changing the POC value without additional adaptation would cause pictures to be decoded incorrectly. In order to avoid this, additional adaptation of the bitstream is performed. In particular, header information of the compressed stream is modified, converting the weighted prediction mode from an implicit mode to an explicit mode. This is done in the following steps:

Modify the Picture Parameter Set (PPS), by setting weighted_bipred_flag to 1,

Calculate a weighted_table for each frame and insert it into the stream,

Modify the slice_header, and indicate to which calculated weighted_table it shall refer for weighted prediction.

For frame insertion, a single procedure is applied irrespective of the value of weighted_bipred_idc. The POC value of each frame is multiplied by 2, which enables the video scrambling unit 220 to insert frames without affecting the decoding, for any value of weighted_bipred_idc and for any type of edit_gop.

Preferably, special care should also be taken when handling baseline-profile streams. In order to scramble a baseline-profile stream, the scrambling unit modifies the high level syntax of the stream so that it becomes a valid main-profile stream. This modification comprises the following steps:

Modify the SPS, to disguise the baseline-profile stream as a main-profile stream; and Change some P frames into B frames.

In baseline profile, there are no B-frames and generally the POC will evolve in an incremental way. This is not the case in main profile where the POC is not incremental between frames, due to the different orderings used for decoding of the AUs and presentation of the frames. Consequently, in the case of a baseline profile stream, if the scrambling unit merely modifies the POC, it may be easy for a malicious user to detect this and undo the scrambling. P-frames in the baseline profile stream can be converted to appear as B-frames in the main profile stream without re-encoding and with only high level syntax modification. Once the syntax of the stream has been adapted in this way, the scrambling process can be applied as already described above. The POC values of AUs in the stream can be modified with a reduced likelihood that a malicious user will be able to identify and reverse the scrambling process, merely by gaining access to the output of the hardware video decoder 130.

In order to enable correct descrambling of the decoded stream in the video descrambling unit 230 before rendering, a set of metadata is generated during the scrambling process (POC-reshuffling or frame insertion, in the detailed examples above). For each AU that goes into the output buffer 330, the video scrambling unit 220 provides the following associated metadata:

poc_org: an integer which is set to the original POC value (for an existing AU) or set to −1 (for an inserted frame)

poc_new: an integer which is the modified POC value after application of the scrambling process org_flag; a Boolean value (represented by an integer). When this is set to 0 it denotes an inserted frame, which should be discarded for rendering. When set to 1, it denotes an original frame, which should be rendered.

The descrambling processes will not be described in detail, since they simply reverse the scrambling processes, which have already been described in detail above. Those skilled in the art will, by this stage, readily understand how to implement the corresponding descrambling processes.

The foregoing description has concentrated on the stream-level modifications that are used to implement scrambling. In some cases, system-level modifications may be required as well. For example, in some known video decoders, the input to the decoder comprises a Composition Time Stamp (CTS) in addition to the AU. The composition time stamp is a time reference indicating the instant at which a decode frame shall be presented on the display. (In MPEG-2 systems, this is also known as the presentation time stamp: PTS.) The CTS is usually provided at the system layer, which encapsulates the stream. In an ideal system, the CTS and POC are correlated in time. If the decoder uses the CTS, in addition to the AUs, to decode the video, then the CTS should be modified in the scrambling process, so that it is consistent with the POC value of each AU. This will avoid errors in the decoder, due to inconsistency between CTS and POC values.

In this case, the scrambling metadata for each AU will be extended with the two following variables (each of type long int) in order to ensure proper descrambling:

cts_org: the original CTS value or −1 for an inserted frame cts_new: the modified CTS value after application of the scrambling process As mentioned earlier, the description of the scrambling processes above did not take into account the use of the random control unit 240, which activates and deactivates the scrambling at random times. However, the essential details of the scrambling are the same when the random control module 240 is used. When the scrambling is de-activated, for a given AU, the poc_new value will be equal to the poc_org value and the org_flag will be equal to 1.

Figure 13:
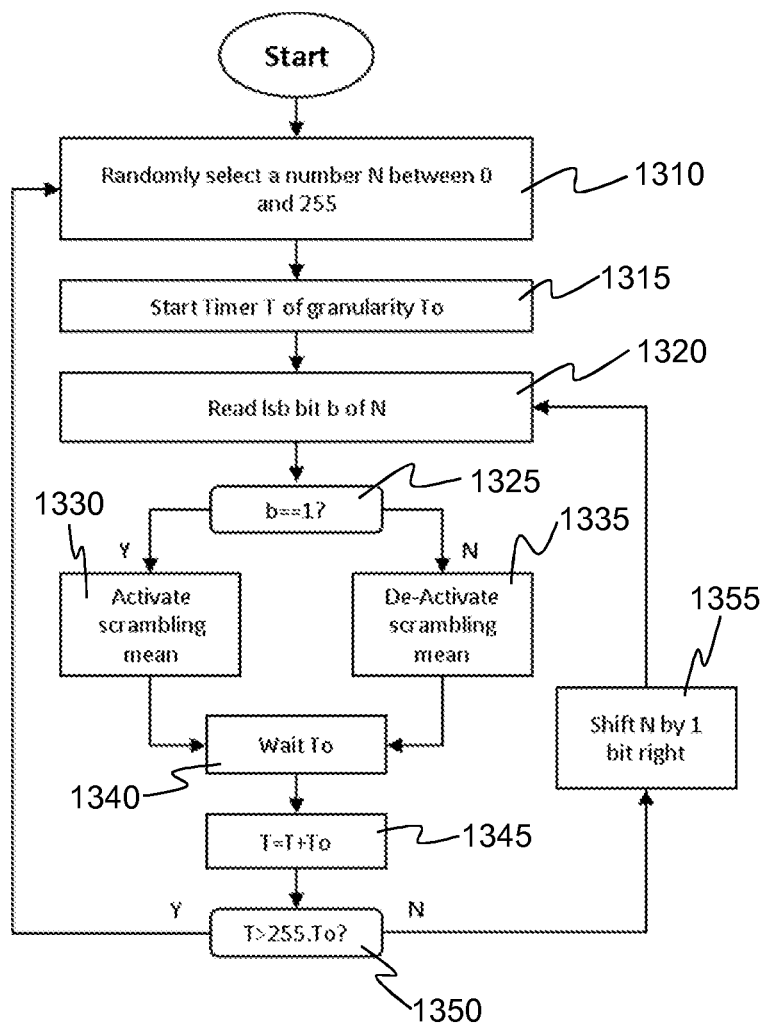
FIG. 13 is a flowchart illustrating a method executed by the random control unit of FIG. 2.

An exemplary method executed by the random control unit 240 will now be described, with reference to the flowchart of FIG. 13. The random control unit is operable to randomly activate and deactivate the scrambling. FIG. 13 illustrates the activation/deactivation process for one scrambling method. This process is replicated for each scrambling method. The method starts and the random control unit 240 randomly selects an 8-bit number N, between 0 and 255 (excluding 0 and 255). This 8-bit number is generated by the random number generator 242 of the random control unit 240. Next, in step 1315, the unit starts a timer T of granularity $T_0$. In step 1320, the random control unit reads the least significant bit b of the number N. In step 1325, it checks whether b is equal to 1. If so, scrambling is activated, in step 1330. If not (that is, b is equal to 0), scrambling is deactivated, in step 1335. In either case, the method then proceeds to step 1340 and waits $T_0$ seconds before proceeding to step 1345. In this step, $T_0$ is added to the timer variable T. The random control unit then checks, in step 1350, whether T is greater than 255 times $T_0$. If it is, the method moves to step 1310 and a new number N is randomly selected. If not, the method moves to step 1355 and the existing number N is right-shifted by one bit. From step 1355, the method returns to step 1320.

$T_0$ is chosen to be of the order of seconds, so that the scrambling can be applied in a meaningful way before it is deactivated again. Optionally, $T_0$ can also be randomized, to make it more difficult for a malicious user to detect the activation and deactivation of the scrambling. For the same purpose, the number N can optionally be chosen from the subset of integers between 0 and 255 that contain no more than two adjacent identical bits (in the binary form of N). For example, 0b00101101 would be allowed, but not 0b<u>11</u>100100. This helps to avoid the scrambling means remaining activated or deactivated for a long continuous period.

While the invention has been illustrated and described in detail in the drawings and foregoing description, such illustration and description are to be considered illustrative or exemplary and not restrictive; the invention is not limited to the disclosed embodiments.

For instance, in the embodiments described above, most functional units of the video player are implemented as software running on a general purpose processor but the video decoding is performed by a separate hardware processor. This is not essential. For example, functional units such as the scrambling unit and descrambling unit may be implemented in hardware or in software. Likewise, it is not essential that the video decoder is a bespoke hardware video processor. In other embodiments, it could be implemented by software running on a general purpose processor—either the same processor or a different processor to the one on which the video player application is running.

In the embodiments described above, when performing scrambling by AU-insertion, the inserted AU was a copy of another AU in the same video stream. Another possibility is to synthesise an artificial AU. For example, the scrambling unit can generate an AU that represents an nrB frame with random motion vectors and no texture (that is, a motion-compensated frame difference signal that is zero). Such a frame can be generated automatically based on high level characteristics of the stream (such as width, height, etc). Because it is encoded using motion vectors only, after has been decoded each block of the synthesised frame will be a (randomly selected) copy of part of an arbitrary in reference frame. This method can provide greater visual annoyance than simply inserting a copy of an entire AU.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

Appendix-H.264 Data Structures

As explained previously, in the context of the detailed examples, a H.264 compressed video stream is scrambled by modifying the bitstream in several respects. For completeness and convenient reference, the definitions of the relevant data structures of the H.264 standard are reproduced below.

The right-hand column in each table indicates the size of each data-field. The number in brackets is the size, in bits;

"v" indicates a field of variable size. The following types are defined in the H.264 standard (section 7.2):

- u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with the most significant bit written first.
- ue(v): unsigned integer Exp-Golomb-coded syntax element with the left bit first.
- se(v): signed integer Exp-Golomb-coded syntax element with the left bit first.

Sequence Parameter Set (SPS)

There is at least one occurrence of SPS in every video stream. However, SPS can appear more frequently than once per video. In particular, for broadcast video, where the end user can join the session at any time; or in the case of adaptive streaming, where sequence parameters can change depending on network conditions. The parameters found in the SPS are applicable to all subsequent AUs until a new SPS is found in the stream.

```
seq_parameter_set_data( ) {
    profile_idc                                                     u(8)
    constraint_set0_flag                                            u(1)
    constraint_set1_flag                                            u(1)
    constraint_set2_flag                                            u(1)
    constraint_set3_flag                                            u(1)
    constraint_set4_flag                                            u(1)
    constraint_set5_flag                                            u(1)
    reserved_zero_2bits /* equal to 0 */                            u(2)
    level_idc                                                       u(8)
    seq_parameter_set_id                                            ue(v)
    if( profile_idc == 100 || profile_idc == 110 ||
        profile_idc == 122 || profile_idc == 244 || profile_idc ==
44 ||
        profile_idc == 83 || profile_idc == 86 || profile_idc ==
118 ||
        profile_idc == 128 ) {
        chroma_format_idc                                           ue(v)
        if( chroma_format_idc == 3 )
            separate_colour_plane_flag                              u(1)
        bit_depth_luma_minus8                                       ue(v)
        bit_depth_chroma_minus8                                     ue(v)
        qpprime_y_zero_transform_bypass_flag                        u(1)
        seq_scaling_matrix_present_flag                             u(1)
        if( seq_scaling_matrix_present_flag )
            for( i = 0; i < ( ( chroma_format_idc != 3 ) ? 8 : 12 );
i++ ) {
                seq_scaling_list_present_flag[ i ]                  u(1)
                if( seq_scaling_list_present_flag[ i ] )
                    if( i < 6 )
                        scaling_list( ScalingList4x4[ i ], 16,
                            UseDefaultScalingMatrix4x4Flag[
                                i ])
                    else
                        scaling_list( ScalingList8x8[ i − 6 ], 64,
                            UseDefaultScalingMatrix8x8Flag[
                                i − 6 ] )
            }
    }
    log2_max_frame_num_minus4                                       ue(v)
    pic_order_cnt_type                                              ue(v)
    if( pic_order_cnt_type == 0 )
        log2_max_pic_order_cnt_lsb_minus4                           ue(v)
    else if( pic_order_cnt_type == 1 ) {
        delta_pic_order_always_zero_flag                            u(1)
        offset_for_non_ref_pic                                      se(v)
        offset_for_top_to_bottom_field                              se(v)
        num_ref_frames_in_pic_order_cnt_cycle                       ue(v)
        for( i = 0; i <
            num_ref_frames_in_pic_order_cnt_cycle; i++ )
            offset_for_ref_frame[ i ]                               se(v)
    }
    max_num_ref_frames                                              ue(v)
    gaps_in_frame_num_value_allowed_flag                            u(1)
    pic_width_in_mbs_minus1                                         ue(v)
    pic_height_in_map_units_minus1                                  ue(v)
    frame_mbs_only_flag                                             u(1)
    if( !frame_mbs_only_flag )
        mb_adaptive_frame_field_flag                                u(1)
    direct_8x8_inference_flag                                       u(1)
    frame_cropping_flag                                             u(1)
    if( frame_cropping_flag ) {
        frame_crop_left_offset                                      ue(v)
        frame_crop_right_offset                                     ue(v)
        frame_crop_top_offset                                       ue(v)
        frame_crop_bottom_offset                                    ue(v)
    }
    vui_parameters_present_flag                                     u(1)
    if( vui_parameters_present_flag )
        vui_parameters( )
}
```

Picture Parameter Set (PPS)

There is at least one occurrence of PPS in every video stream. However. PPS can appear more frequently than once per video. In particular, for broadcast video, where the end user can join the session at any time; or in the case of adaptive streaming, where sequence parameters can change depending on network conditions. The parameters found in the PPS are applicable to all subsequent AUs until a new PPS is found in the stream. SPS and PPS are usually inserted in the stream one after the other.

```
pic_parameter_set_rbsp( ) {
    pic_parameter_set_id                                            ue(v)
    seq_parameter_set_id                                            ue(v)
    entropy_coding_mode_flag                                        u(1)
    bottom_field_pic_order_in_frame_present_flag                    u(1)
    num_slice_groups_minus1                                         ue(v)
    if( num_slice_groups_minus1 > 0 ) {
        slice_group_map_type                                        ue(v)
        if( slice_group_map_type == 0 )
            for( iGroup = 0; iGroup <= num_slice_groups_minus1;
                                                       iGroup++ )
                run_length_minus1[ iGroup ]                         ue(v)
        else if( slice_group_map_type == 2 )
            for( iGroup = 0; iGroup <num_slice_groups_minus1;
                                                       iGroup++ ) {
                top_left[ iGroup ]                                  ue(v)
                bottom_right[ iGroup ]                              ue(v)
            }
        else if( slice_group_map_type == 3 ||
                 slice_group_map_type == 4 ||
                 slice_group_map_type == 5 ) {
            slice_group_change_direction_flag                       u(1)
            slice_group_change_rate_minus1                          ue(v)
        } else if( slice_group_map_type == 6 ) {
            pic_size_in_map_units_minus1                            ue(v)
            for( i = 0; i <= pic_size_in_map_units_minus1 ; i++ )
                slice_group_id[ i ]                                 u(v)
        }
    }
    num_ref_idx_l0_default_active_minus1                            ue(v)
    num_ref_idx_l1_default_active_minus1                            ue(v)
    weighted_pred_flag                                              u(1)
    weighted_bipred_idc                                             u(2)
    pic_init_qp_minus26 /* relative to 26 */                        se(v)
    pic_init_qs_minus26 /* relative to 26 */                        se(v)
    chroma_qp_index_offset                                          se(v)
    deblocking_filter_control_present_flag                          u(1)
    constrained_intra_pred_flag                                     u(1)
    redundant_pic_cnt_present_flag                                  u(1)
```

```
if( more_rbsp_data( ) ) {
    transform_8x8_mode_flag                                      u(1)
    pic_scaling_matrix_present_flag                              u(1)
    if( pic_scaling_matrix_present_flag )
        for( i = 0; i < 6 +
            ( (chroma_format_idc != 3 ) ? 2 : 6 ) *
                transform_8x8_mode_flag;
            i++ ) {
            pic_scaling_list_present_flag[ i ]                   u(1)
            if( pic_scaling_list_present_flag[ i ] )
                if( i < 6 )
                    scaling_list( ScalingList4x4[ i ], 16,
                        UseDefaultScalingMatrix4x4Flag[ i ] )
                else
                    scaling_list( ScalingList8x8[ i – 6 ], 64,
                        UseDefauitScalingMatrix8x8Flag[ i – 6 ] )
        }
    second_chroma_qp_index_offset                                se(v)
}
rbsp_trailing_bits( )
}
```

Slice Header Syntax

Typically, there is one slice per AU representing a video frame. However, the standard does not prevent an encoder from creating many slices per AU, each slice representing a portion of a video frame. For each slice, there is a slice header in the bitstream.

```
slice_header( ) {
    first_mb_in_slice                                            ue(v)
    slice_type                                                   ue(v)
    pic_parameter_set_id                                         ue(v)
    if( separate_colour_plane_flag == 1 )
        colour_plane_id                                          u(2)
    frame_num                                                    u(v)
    if( !frame_mbs_only_flag ) {
        field_pic_flag                                           u(1)
        if( field_pic_flag )
            bottom_field_flag                                    u(1)
    }
    if( IdrPicFlag )
        idr_pic_id                                               ue(v)
    if( pic_order_cnt_type == 0 ) {
        pic_order_cnt_lsb                                        u(v)
        if( bottom_field_pic_order_frame_present_flag
            && !field_pic_flag )
            delta_pic_order_cnt_bottom                           se(v)
    }
    if( pic_order_cnt_type == 1 &&
        !delta_pic_order_always_zero_flag )
    {
        delta_pic_order_cnt[ 0 ]                                 se(v)
        if( bottom_field_pic_order_in_frame_present_flag
            && !field_pic_flag )
            delta_pic_order_cnt[ 1 ]                             se(v)
    }
    if( redundant_pic_cnt_present_flag )
        redundant_pic_cnt                                        ue(v)
    if( slice_type == B )
        direct_spatial_mv_pred_flag                              u(1)
    if( slice_type == P || slice_type == SP || slice_type == B )
    {
        num_ref_idx_active_override_flag                         u(1)
        if( num_ref_idx_active_override_flag ) {
            num_ref_idx_l0_active_minus1                         ue(v)
            if( slice_type == B )
                num_ref_idx_l1_active_minus1                     ue(v)
        }
    }
    if( nal_unit_type == 20 )
        ref_pic_list_mvc_modification( ) /* see Annex H */
    else
        ref_pic_list_modification( )
    if( ( weighted_pred_flag && ( slice_type == P ||
        slice_type == SP ) )
        || ( weighted_bipred_idc == 1 && slice_type == B ) )
            pred_weight_table( )
    if( nal_ref_idc != 0 )
        dec_ref_pic_marking( )
    if( entropy_coding_mode_flag && slice_type != I &&
        slice_type != SI
    )
        cabac_init_idc                                           ue(v)
    slice_qp_delta                                               se(v)
    if( slice_type == SP || slice_type == SI ) {
        if( slice_type == SP )
            sp_for_switch_flag                                   u(1)
        slice_qs_delta                                           se(v)
    }
    if( deblocking_filter_control_present_flag ) {
        disable_deblocking_filter_idc                            ue(v)
        if( disable_deblocking_filter_idc != 1 ) {
            slice_alpha_c0_offset_div2                           se(v)
            slice_beta_offset_div2                               se(v)
        }
    }
    if( num_slice_groups_minus1 > 0 &&
        slice_group_map_type >= 3
        && slice_group_map_type <= 5)
        slice_group_change_cycle                                 u(v)
}
```

The invention claimed is:

1. Apparatus for decoding a compressed video, the apparatus comprising:
a video scrambling unit, adapted to receive the compressed video and scramble it, to produce a scrambled compressed video, wherein one or more operations are performed on Access Units of the compressed video, the one or more operations including reordering Access Units, inserting one or more Access Units, removing one or more Access Units and replacing one or more Access Units;
a video decoder, arranged to receive the scrambled compressed video from the scrambling unit and adapted to decode it, to produce a scrambled decompressed video; and
a video descrambling unit, arranged to receive the scrambled decompressed video from the video decoder and adapted to descramble it, to produce a descrambled decompressed video.

2. The apparatus of claim 1, wherein the video scrambling unit is adapted to scramble the compressed video in a manner that:
does not prevent the decoding of the video by the video decoder;
modifies a visual content of the scrambled decompressed video after decoding; and
is reversible by the video descrambling unit.

3. The apparatus of claim 1, wherein:
the video scrambling unit is adapted to produce scrambling metadata that describes a scrambling operation performed by the video scrambling unit; and
the video descrambling unit is arranged to receive the scrambling metadata from the video scrambling unit and is adapted to use it to descramble the scrambled decompressed video received from the video decoder.

4. The apparatus of claim 1, wherein the scrambling performed by the video scrambling unit is responsive to an activation signal.

5. The apparatus of claim 4, wherein the activation signal is applied intermittently.

6. The apparatus of claim 1, wherein the video scrambling unit is controlled to apply scrambling to first portions of the compressed video and not to apply scrambling to second portions of the compressed video.

7. The apparatus of claim 6, wherein the first and second portions are selected randomly or pseudo-randomly.

8. The apparatus of claim 1, wherein the video decoder is a hardware video decoder.

9. The apparatus of claim 1, wherein the compressed video and the video decoder conform to a predetermined video coding standard; and the video scrambling unit is adapted to scramble the compressed video in such a way that the scrambled compressed video conforms to the predetermined video coding standard.

10. The apparatus of claim 9, wherein the video decoder and the compressed video conform to a H.264 standard and wherein the scrambling comprises modifying a Picture Order Count of a plurality of Access Units in the H.264 compressed video.

11. The apparatus of claim 10, wherein the video scrambling unit is adapted to:
  detect that the Picture Order Count is encoded implicitly in the compressed video and, in response:
  modify header information of the compressed video in order to signal that the Picture Order Count is encoded explicitly; and
  assign an explicit Picture Order Count value in each Access Unit of the compressed video.

12. The apparatus of claim 10, wherein the video scrambling unit is adapted to detect in the compressed video a coding mode that would require an adaption of one or more of the plurality of Access Units such that decoding is independent from the Picture Order Count and, in response:
  disable the scrambling; or
  adapt one or more Access Units so that the video decoder does not need to use the Picture Order Count to decode the one or more of the plurality of Access Units.

13. The apparatus of claim 11, wherein the video scrambling unit is adapted to:
  detect that the compressed video is encoded according to a Baseline Profile of the H.264 standard and, in response,
  modify the compressed video to convert it to another H.264 Profile.

14. The apparatus of claim 1, wherein the video descrambling unit is arranged to receive the scrambled decompressed video in a pixel domain from the video decoder.

15. A method of decoding a compressed video, comprising:
  scrambling the compressed video, wherein one or more operations are performed on Access Units of the compressed video, the one or more operations including reordering Access Units, inserting one or more Access Units, removing one or more Access Units and replacing one or more Access Units, to produce a scrambled compressed video;
  delivering the scrambled compressed video to a video decoder, for decoding the scrambled compressed video to produce a scrambled decompressed video;
  receiving from the video decoder the scrambled decompressed video; and
  descrambling the scrambled decompressed video, to produce a descrambled decompressed video.

16. The method of claim 15, wherein scrambling is responsive to a random activation signal.

17. The method of claim 15, further comprising:
  generating metadata that describes operations performed to produce the scrambled compressed video; and
  using the metadata to produce the descrambled decompressed video.

18. The method of claim 15, further comprising:
  detecting, in the compressed video, a coding mode that would require an adaption of one or more of the plurality of Access Units such that decoding is independent from the Picture Order Count; and
  in response, disabling the scrambling; or
  adapting one or more Access Units so that the video decoder does not need to use the Picture Order Count to decode the one or more Access Units.

19. The method of claim 18, further comprising:
  modifying the syntax of the compressed video.

20. A non-transitory computer readable medium storing a computer program, the computer program comprising computer program code means adapted to perform all the steps of claim 15 when said computer program is run on a computer.

* * * * *